Patented Nov. 6, 1928.

1,690,796

UNITED STATES PATENT OFFICE.

WERNER SCHULEMANN, OF VOHWINKEL, AND KURT MEISENBURG, OF ELBERFELD, GERMANY, ASSIGNORS, BY MESNE ASSIGNMENTS, TO WINTHROP CHEMICAL COMPANY, INC., OF NEW YORK, N. Y., A CORPORATION OF NEW YORK.

PHARMACEUTICAL COMPOUND.

No Drawing. Application filed February 20, 1925, Serial No. 10,657, and in Germany March 21, 1924.

It has been found that the previously unknown unsymmetrically disubstituted barbituric acids containing besides an unsaturated alicyclic nucleus also a saturated or unsaturated alkyl group are valuable hypnotics. The quality of the sleep produced is very good. In particular the new compounds are free of noxious secondary effects and have no narcotic action.

In order to prepare the new barbituric acid derivatives the unsymmetrically disubstituted malonic esters or cyanacetic esters of the general formulæ:

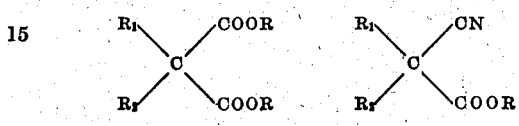

in which $R_1$ is an unsaturated alicyclic radicle and $R_2$ is a saturated or unsaturatel alkyl residue, or their derivatives, as for example the corresponding acyl chlorides, esters, amines, amino esters, nitriles etc. are converted into the barbituric acids according to the usual methods employed for the preparation of the barbituric acids and their derivatives alkylated or arylated on the carbon. It is also possible to proceed by first introducing the second substituent in the barbituric acids substituted in the 5-position by one of the above mentioned substituents or into suitable intermediate products for the preparation of these barbituric acids and converting the intermediate products so obtained into the barbituric acids. In this method the mono-substituted barbituric acids mentioned, or their intermediate products, may be prepared either from mono-substituted malonic esters or cyanacetic esters or from their derivatives, or also they may be obtained by introducing one of the substituents named into the barbituric acids or their intermediate products.

The preparation of the new products takes place with remarkable ease and good yields. Steric hindrances are not noticeable. Certain of the new sedatives as for instance the $\triangle$-1.2-cyclohexenylethylbarbituric acid described in Example 3 are unsymmetrically constituted.

The new compounds are generally whitish crystalline products easily soluble in a dilute sodium carbonate solution, acetone, acetic acid ester and alcohol and soluble with difficulty in ether, benzene and water.

*Example 1.*—470 parts by weight of monoethylmalonic ester are introduced with ice cooling and stirring into a solution of 57.5 parts by weight of sodium in 950 parts of absolute alcohol. The sodium monoethylmalonic ester formed is then gradually treated without ice cooling with 420 parts by weight of 1-brom-$\triangle$-2.3-cyclohexene. The reaction mixture becomes warm, sodium bromide separates out and the mixture becomes neutral after a short time. The sodium bromide is filtered off, the filtrate freed from alcohol by distillation, the residue taken up in water, siphoned off, dried over calcium chloride and distilled in vacuo. $\triangle$-2.3-cyclohexenylethylmalonic ester boils at 149–151° C. at 12 mm. 46 parts by weight of sodium are dissolved in 850 parts of alcohol, 90 parts by weight of urea are introduced into the cooled sodium ethylate solution and after this is dissolved the mixture is treated with 270 parts by weight of $\triangle$-2.3-cyclohexenylethylmalonic ester. The reaction mixture is boiled for 6 hours, freed from alcohol by vacuum distillation, taken up in water and the $\triangle$-2.3-cyclohexenylethylbarbituric acid of a melting point 172° C. is precipitated with acetic acid.

*Example 2.*—500 parts by weight of monoallylmalonic ester are introduced with stirring and ice cooling into a solution of 57.5 parts by weight of sodium in 950 parts of absolute alcohol. The sodium monoallylmalonic ester formed is then treated gradually without ice cooling with 420 parts by weight of 1-brom-$\triangle$-2.3-cyclohexene. The reaction mixture becomes warm, sodium bromide separating out and is neutral when the material has been added. The working up, which is carried out as above, yields the $\triangle$-2.3-cyclohexenylallylmalonic ester boiling at 150–162° C. at 8 mm. 46 parts by weight of sodium are dissolved in 850 parts of absolute alcohol, 90 parts by weight of urea are introduced into the cooled sodium ethylate solution and after all has dissolved the mixture is treated with 280 parts by weight of $\triangle$-2.3-cyclohexenylallylmalonic ester. The reaction mixture is boiled for 6 hours under a reflux condenser. The working up is carried out in the same manner as in Example 1 and yields ⊿-2.3-cyclohexenylallylbarbituric acid melting at 149° C.

*Example 3.*—772 parts by weight of ⊿-1.2-cyclohexenylcyanacetic acid ester are introduced with stirring and ice cooling into a solution of 92 parts by weight of sodium in 1500 parts of absolute alcohol. The sodium ⊿-1.2-cyclohexenylcyanacetic acid ester formed is then gradually treated without ice cooling with 750 parts by weight of ethyl iodide. The reaction mixture becomes warm, sodium iodide separating out and the whole is neutral after a short time. The working up is carried out as in Example 1 yields ⊿-1.2-cyclohexenylethylcyanacetic acid ester boiling at 125° C. at 4 mm. 72 parts by weight of sodium are dissolved in 1086 parts by weight of absolute alcohol and boiled for 3¾ hours with 285 parts by weight of guanidine sulfate, then 221 parts by weight of ⊿-1.2-cyclohexenylethylcyanacetic acid ester are added and boiling is continued for a further 12 hours. The residue remaining after distilling off the alcohol is boiled with 10 times its weight of dilute sulfuric acid and then ⊿-1.2-cyclohexenylethylbarbituric acid which separates out is recrystallized from hot water. The melting point is 170° C.

The new compound is generally a whitish crystalline product, easily soluble in dilute sodium carbonate solution, acetone acetic acid ester and alcohol and soluble with difficulty in ether, benzene and water. The product has most probably the formula:

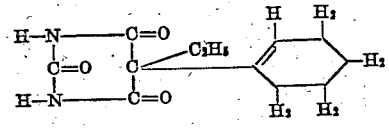

In place of ⊿-1.2-cyclohexenylcyanacetic acid ester ⊿-1.2-methylcyclohexenyl or ⊿-1.2-cyclopentenylcyanacetic acid ester may be used in a similar manner.

*Example 4.*—Into a mixture of 1200 parts by weight of cyclopentenylcyanacetic acid ester and 730 parts by weight of ethylbromide a solution of 153 parts by weight of sodium in 3000 parts by weight of alcohol is introduced. The reaction mixture is warmed for several hours on the water bath. The working up carried out as in Example 1 yields ⊿-1.2-cyclopentenylethylcyanacetic acid ester boiling at 128° C. at 8 mm. 21.4 parts by weight of sodium are dissolved in 300 parts by weight of absolute alcohol and boiled for 3¾ hours with 95.1 parts by weight of guanidine sulfate. Then 68 parts by weight of cyclopentenylethylcyanacetic acid ester are added and boiling is continued for a further 12 hours. The residue remaining after distilling off the alcohol is boiled with 10 times its weight of dilute sulfuric acid and the ⊿-1.2-cyclopentenylethylbarbituric acid ester which separates out is recrystallized from hot water. The melting point is 168° C.

We claim:—

1. The herein described new unsymmetrically disubstituted barbituric acids of the general formula:

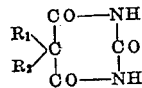

where $R_1$ is an unsaturated alicyclic nucleus and $R_2$ is a saturated or unsaturated alkyl residue, which are generally whitish crystalline products being easily soluble in a dilute solution of sodium carbonate and soluble with difficulty in benzene and water; and being valuable hypnotics, substantially as described.

2. The herein described new unsymmetrically disubstituted barbituric acids of the general formula:

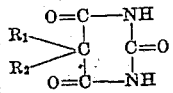

wherein $R_1$ represents a cyclohexenyl residue and $R_2$ represents a saturated or unsaturated alkyl residue, which are generally whitish crystalline products being easily soluble in a dilute solution of sodium carbonate and soluble with difficulty in benzene and water; and being valuable hypnotics, substantially as described.

3. The herein described new unsymmetrically disubstituted barbituric acids of the general formula:

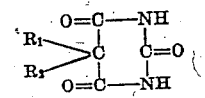

wherein $R_1$ represents a cyclohexenyl residue and $R_2$ represents an ethyl residue, which are generally whitish crystalline products being easily soluble in a dilute solution of sodium carbonate and soluble with difficulty in benzene and water; and being valuable hypnotics, substantially as described.

4. The herein described ⊿-1.2-cyclohexenylethylbarbituric acid having most probably the formula:

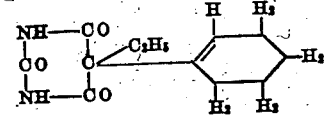

crystallizing from water in crystals melting at 170 C. being soluble with difficulty in benzene and water and being a valuable hypnotic, substantially as described.

In testimony whereof we have hereunto set our hands.

WERNER SCHULEMANN.
KURT MEISENBURG.